(12) United States Patent
Sun et al.

(10) Patent No.: US 7,916,479 B2
(45) Date of Patent: Mar. 29, 2011

(54) HEAT DISSIPATING SYSTEM AND CONNECTOR THEREOF

(75) Inventors: Zheng-Heng Sun, Taipei Hsien (TW); Xiao-Feng Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/491,243

(22) Filed: Jun. 25, 2009

(65) Prior Publication Data
US 2010/0309625 A1 Dec. 9, 2010

(30) Foreign Application Priority Data
Jun. 5, 2009 (CN) .......................... 2009 1 0302963

(51) Int. Cl.
*H05K 7/20* (2006.01)
(52) U.S. Cl. ........ 361/695; 361/690; 361/719; 361/721; 174/16.1; 257/721
(58) Field of Classification Search .................. None
See application file for complete search history.

(56) References Cited

U.S. PATENT DOCUMENTS

| 5,077,601 | A | * | 12/1991 | Hatada et al. ................ 257/722 |
| 5,361,188 | A | * | 11/1994 | Kondou et al. ............... 361/695 |
| 5,644,472 | A | * | 7/1997 | Klein ............................ 361/695 |
| 6,130,820 | A | * | 10/2000 | Konstad et al. ............... 361/695 |
| 6,227,887 | B1 | * | 5/2001 | Choy ............................ 439/160 |
| 6,290,519 | B1 | * | 9/2001 | Lee ............................... 439/157 |
| 6,461,169 | B1 | * | 10/2002 | Harrison et al. ............... 439/65 |
| 6,736,660 | B2 | * | 5/2004 | Ku ................................ 439/328 |
| 6,796,831 | B1 | * | 9/2004 | Yasufuku et al. ............. 439/485 |
| 7,379,297 | B2 | * | 5/2008 | Peterson et al. .............. 361/690 |
| 7,403,383 | B2 | * | 7/2008 | McGuff et al. ............... 361/688 |
| 7,468,884 | B2 | * | 12/2008 | Carr et al. ................. 361/679.41 |
| 7,474,528 | B1 | * | 1/2009 | Olesiewicz et al. .......... 361/695 |
| 7,480,147 | B2 | * | 1/2009 | Hoss et al. .................... 361/721 |
| 7,517,239 | B1 | * | 4/2009 | Ju ................................. 439/159 |
| 7,619,885 | B2 | * | 11/2009 | Lin ............................... 361/690 |
| 7,637,748 | B2 | * | 12/2009 | Chung et al. .................. 439/59 |
| 2006/0133036 | A1 | * | 6/2006 | Durney ......................... 361/695 |

* cited by examiner

*Primary Examiner* — Boris L Chervinsky
(74) *Attorney, Agent, or Firm* — Raymond J. Chew

(57) ABSTRACT

A heat dissipating system includes a chassis, a motherboard mounted in the chassis, a number of connectors mounted on the motherboard in parallel to form a passage between every two adjacent connectors, and a heat dissipating element mounted to the chassis and aligned with the passages. Each of the connectors includes a socket and an inserting portion. The socket defines a slot. The inserting portion includes a main body and a protrusion extending from the main body towards the slot. A cross-section of the protrusion is trapezoidal-shaped. A side surface of the protrusion is inclined to form an airflow guiding structure.

5 Claims, 3 Drawing Sheets

HEAT DISSIPATING SYSTEM AND CONNECTOR THEREOF

BACKGROUND

1. Technical Field

The present disclosure relates to heat dissipating systems, and particularly to a heat dissipating system having a connector.

2. Description of Related Art

In a rack-mount server, heat dissipation is accomplished by drawing outside air from a front end of the server and emitting heated air from the back end of the server without much thought given to the path of the airflow inside the server, resulting in poor heat dissipation.

DETAILED DESCRIPTION

Figure 1:
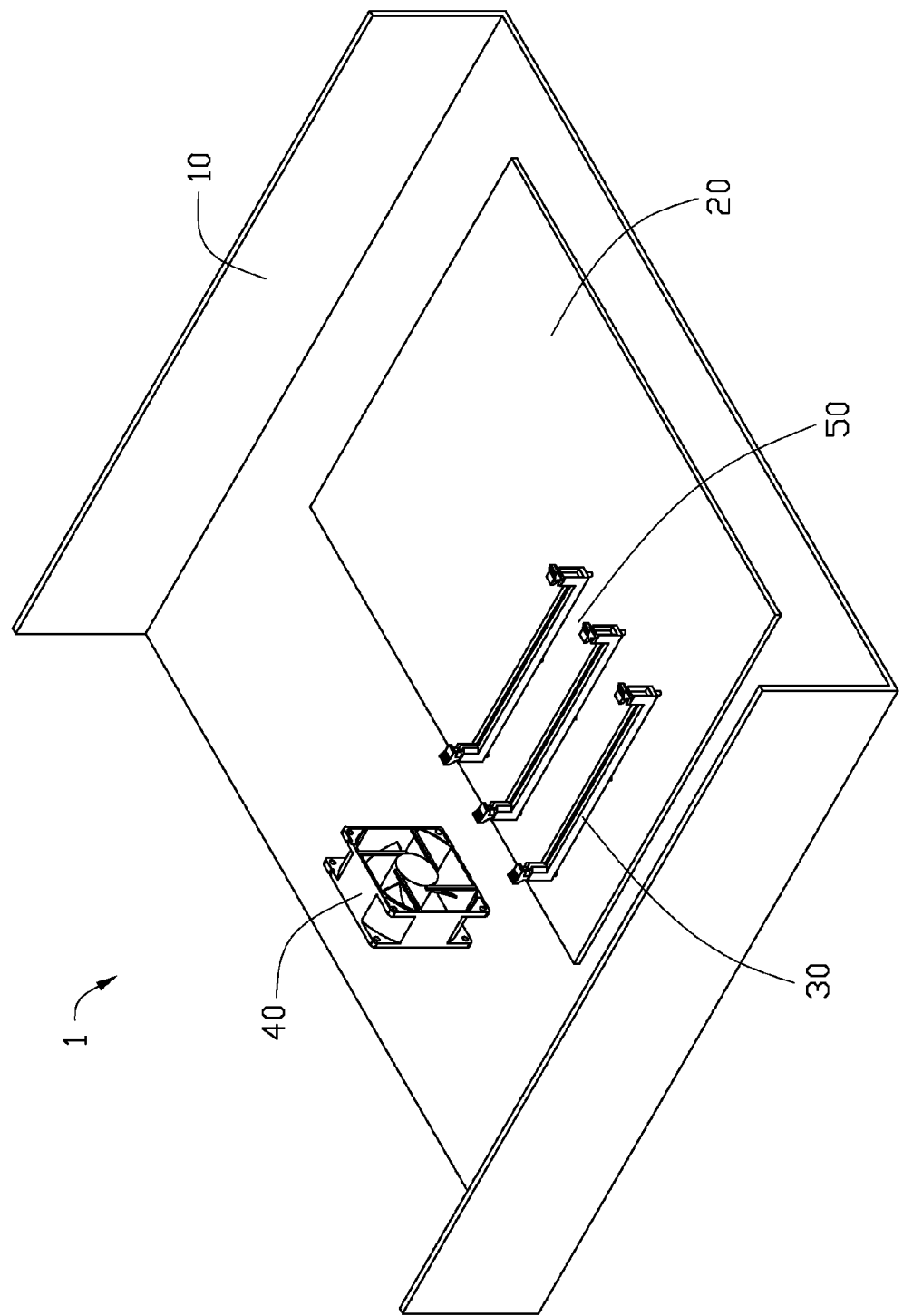
FIG. 1 is a schematic, isometric view of an exemplary embodiment of a heat dissipating system, the heat dissipating system including connectors.

Referring to FIG. 1, an exemplary heat dissipating system 1 includes a chassis 10, such as a server chassis, a motherboard 20 mounted in the chassis 10, a plurality of connectors 30 mounted on the motherboard 20 in parallel to form a passage 50 between every two adjacent connectors 30, and a heat dissipating element such as a fan 40 mounted on the chassis 10 aligned with the passages 50.

Figure 2:
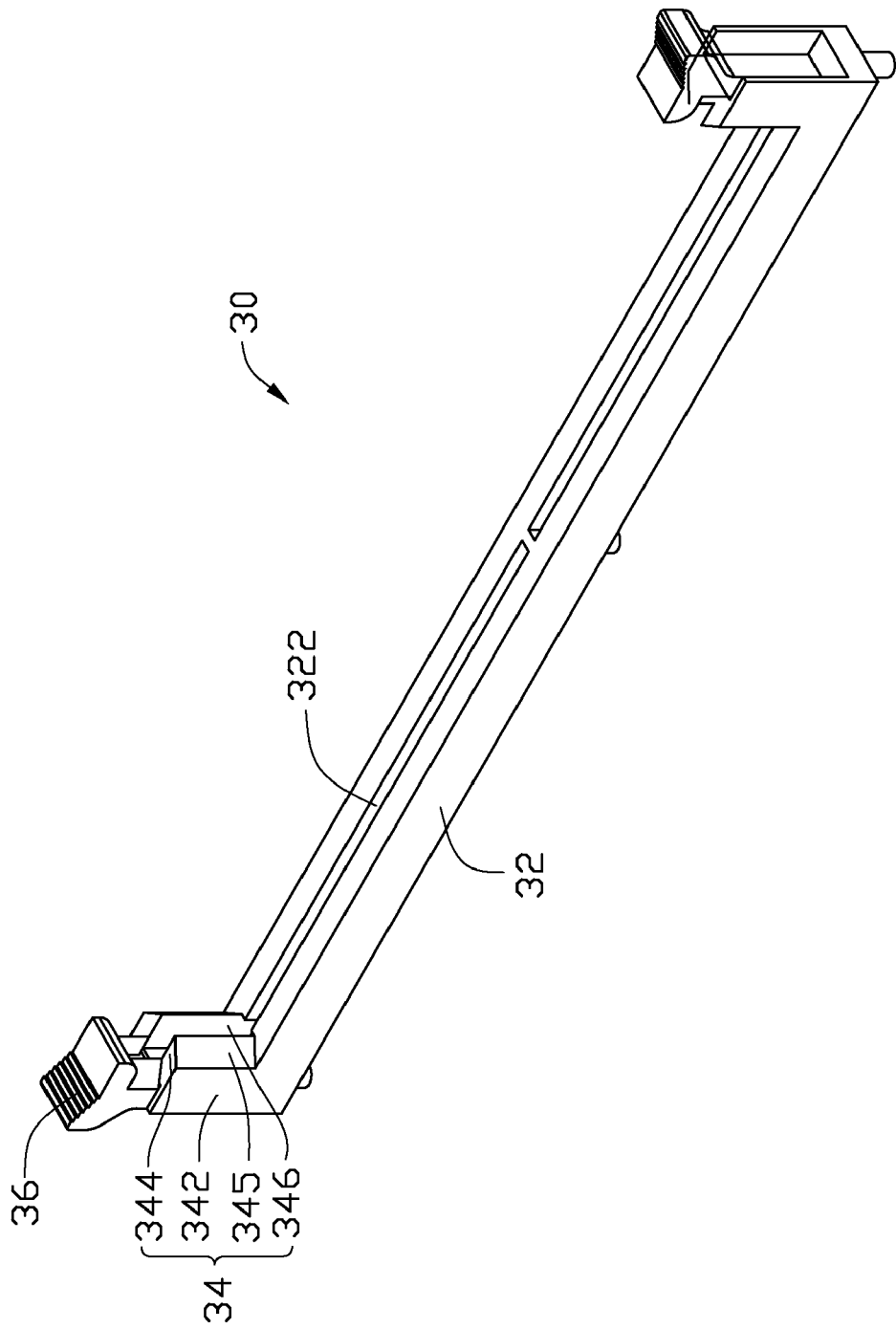
FIG. 2 is a schematic, enlarged view of one of the connectors of FIG. 1.

Referring to FIG. 2, the connector includes a socket 32, two inserting portions 34 perpendicularly extending up from opposite ends of the socket 32, and two latching portions 36 pivotably connected to the corresponding inserting portions 34. Two slots 322 are defined in the socket 32. Each inserting portion 34 includes a main body 342 and a protrusion 344 closely extending from the main body 342 towards the slot 322. A cross-section of the protrusion 344 is trapezoidal-shaped. Two side surfaces 345 of the protrusion 344 are two inclined planes and extend from two side surfaces of the main body 342 towards the slot 322 and the opposite inserting portion 34 to form an airflow guiding structure which guides airflow toward the corresponding external card plugged in the slot. A receiving space 346 is defined between the inserting portions 34. The receiving space 346 communicates with a corresponding slot 322 of the socket 32. In other embodiments, side surfaces 345 that are not located in the receiving space 346 do not need to be inclined.

Figure 3:
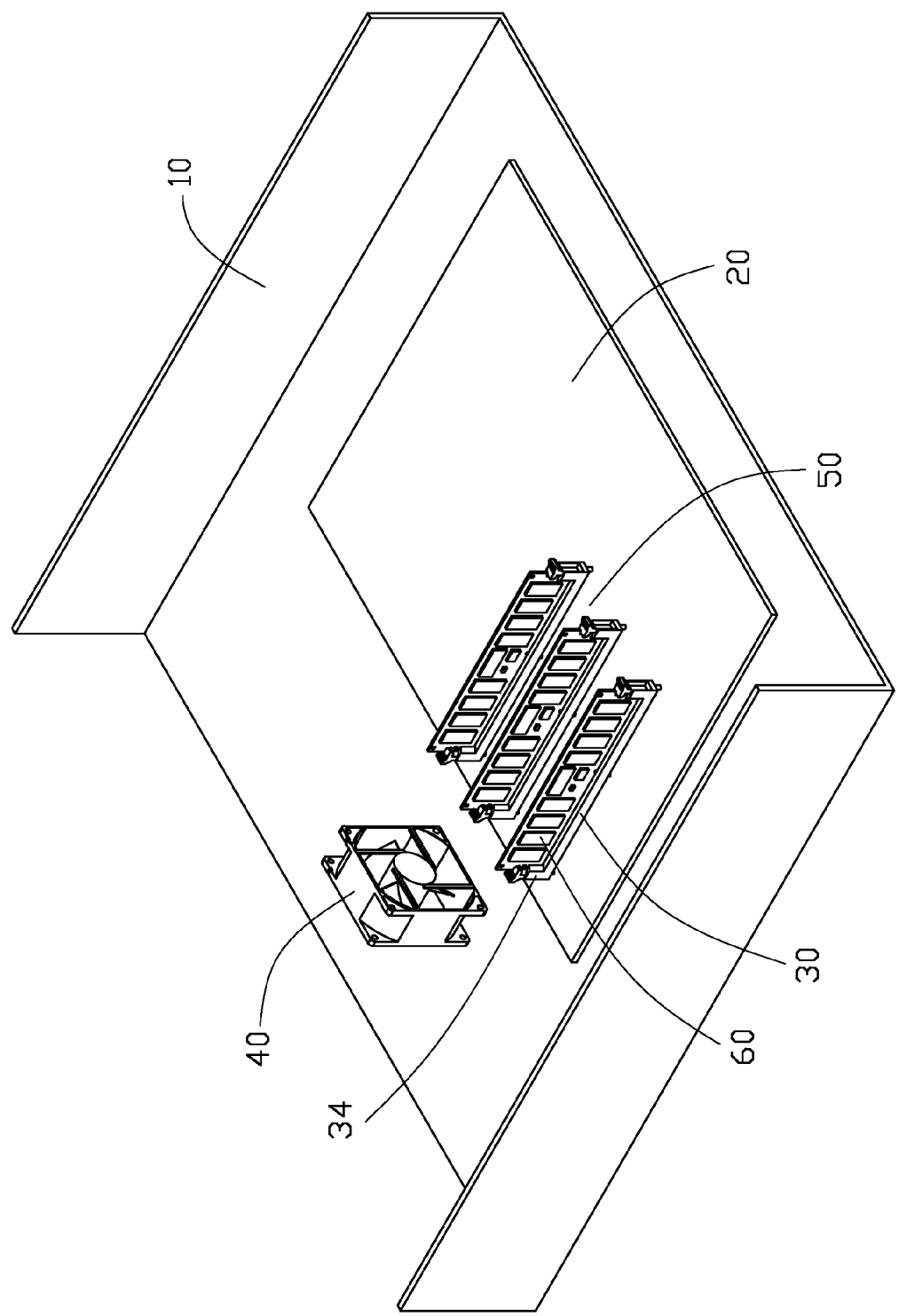
FIG. 3 is similar to FIG. 1, but showing memory cards inserted in the connectors of the heat dissipating system.

Referring to FIG. 3, in assembly, an external card, such as a memory card 60, is received by each connector 30 in the slots 322 of the heat dissipating system 1, with opposite ends of the memory cards 60 accommodated in the receiving spaces 346 of the two inserting portions 34, respectively. When the fan 40 operates, much of the airflow created by the fan 40 enters the passages 50 and flows across corresponding sides of the memory cards 60 facing the passages 50 under the guiding of the inclined side surfaces 345 of the protrusions 344, to dissipate heat from the memory card 60, and then flows out of the passages 50 to further dissipate heat from other electronic elements of the chassis 10 before exiting the chassis 10.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A heat dissipating system for a plurality of external cards, the heat dissipating system comprising:
   a chassis;
   a motherboard mounted in the chassis;
   a plurality of connectors mounted on the motherboard in parallel to form a passage between every two adjacent connectors, each of the connectors comprising:
      a socket defining a slot to accommodate a bottom of a corresponding external card; and
      two opposite inserting portions extending up from two opposite ends of the socket, each inserting portion comprising:
         a main body; and
         a protrusion extending from the main body towards the slot, wherein a cross-section of the protrusion is trapezoidal-shaped, at least one of two side surfaces of the protrusion is inclined and extends from at least one of two side surfaces of the main body towards the slot and the opposite inserting portion to form an airflow guiding structure which guides airflow toward the corresponding external card plugged in the slot; and
   a heat dissipating element mounted on the chassis and aligned with the passages.

2. The heat dissipating system of claim 1, wherein the plurality of connectors is at least a memory card connector.

3. The heat dissipating system of claim 1, wherein the heat dissipating element is a fan.

4. A connector to be mounted on a motherboard, the connector comprising:
   a socket defining a slot; and
   two opposite inserting portions extending upward from two opposite ends of the socket, each inserting portion comprising:
      a main body; and
      a protrusion extending from the main body towards the slot, wherein a cross-section of the protrusion is trapezoidal-shaped, at least one side surface of the protrusion is inclined and extends from at least one of two side surfaces of the main body towards the slot and the opposite inserting portion to form an airflow guiding structure which guides airflow toward a card plugged in the slot.

5. The connector of claim 4, wherein the connector is a memory card connector.

* * * * *